United States Patent
Whinnett et al.

(10) Patent No.: US 6,317,411 B1
(45) Date of Patent: Nov. 13, 2001

(54) METHOD AND SYSTEM FOR TRANSMITTING AND RECEIVING SIGNALS TRANSMITTED FROM AN ANTENNA ARRAY WITH TRANSMIT DIVERSITY TECHNIQUES

(75) Inventors: Nicholas William Whinnett, Paris (GB); Oscar Clop, Fontenay aux Roses; Francesc Boixadera, Sceaux, both of (ES); Kiran Kumar Kuchi, Fort Worth; Kamyar Rohani, Grapevine, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/253,786

(22) Filed: Feb. 22, 1999

(51) Int. Cl.[7] ................................................. H04L 27/26
(52) U.S. Cl. ......................... 370/204; 370/335; 375/267
(58) Field of Search ................................... 370/335, 342, 370/204, 441, 479; 375/200, 267, 299

(56) References Cited

U.S. PATENT DOCUMENTS

| | | | |
|---|---|---|---|
| 5,274,836 | * 12/1993 | Lux ............................................. | 455/1 |
| 5,481,570 | * 1/1996 | Winters .................................. | 375/347 |
| 5,652,764 | * 7/1997 | Kanzaki et al. ........................ | 375/200 |
| 5,680,400 | * 10/1997 | York ....................................... | 370/473 |
| 5,790,588 | * 8/1998 | Fukawa et al. ........................ | 375/200 |
| 5,859,875 | * 1/1999 | Kato et al. ............................. | 375/267 |
| 5,974,042 | * 10/1999 | Frank et al. ........................... | 370/342 |
| 6,127,971 | * 11/2000 | Calderbank et al. ................ | 342/368 |
| 6,256,290 | * 7/2001 | Ramesh .................................. | 370/204 |

FOREIGN PATENT DOCUMENTS

0929161 A * 7/1999 (EP) .................................. H04B/7/12

* cited by examiner

Primary Examiner—Hassan Kizou
Assistant Examiner—Ahmed Elallam
(74) Attorney, Agent, or Firm—L. Bruce Terry; Kenneth A. Haas (57) ABSTRACT

In a method for wireless data communication between a base station and a subscriber unit in a wireless communication system, groups of symbols of an input data stream are commutated to produce a plurality of commutated data streams. The plurality of commutated data streams are then transformed to produce a plurality of transformed data streams. Next, each transformed data stream is spread with a selected one of a plurality of spreading codes to produce a plurality of antenna signals. Finally, each of the plurality of antenna signals is transmitted using a selected one of a plurality of spaced apart antennas, wherein the plurality of spaced apart antennas are spaced apart to provide transmit diversity. In one embodiment, the transform is a space-time transform.

30 Claims, 10 Drawing Sheets

METHOD AND SYSTEM FOR TRANSMITTING AND RECEIVING SIGNALS TRANSMITTED FROM AN ANTENNA ARRAY WITH TRANSMIT DIVERSITY TECHNIQUES

FIELD OF THE INVENTION

The present invention is related in general to wireless communications systems, and more particularly to an improved method and system for transmitting and demodulating a communications signal that has been transmitted from an antenna array using a new combination of transmit diversity techniques.

BACKGROUND OF THE INVENTION

An important goal in designing a wireless communication system is to increase the number of users that may be simultaneously served by the communication system. This goal may be referred to as increasing system capacity. In an interference limited system, such as a code division multiple access (CDMA) wireless communications system, one way to increase capacity is by lowering the transmit power allocated to each user. By lowering the allocated transmit power, interference for all users is lowered, which provides additional capacity which may be used to add new users.

One way to lower the transmit power for each user is to increase the efficiency of the wireless link or channel between the user or subscriber unit and the base station that serves that user. One phenomena that reduces the efficiency of the communications link is fading. Fading may take several forms, one of which is referred to as multi-path fading. Multipath fading is caused by two or more copies of a transmitted signal combining at the receiver in a way that reduces the overall received signal level.

In the prior art, several diversity techniques have been proposed for reducing the effects of fading. These techniques include orthogonal transmit diversity (OTD) and space-time transmit diversity (STTD).

Figure 1:
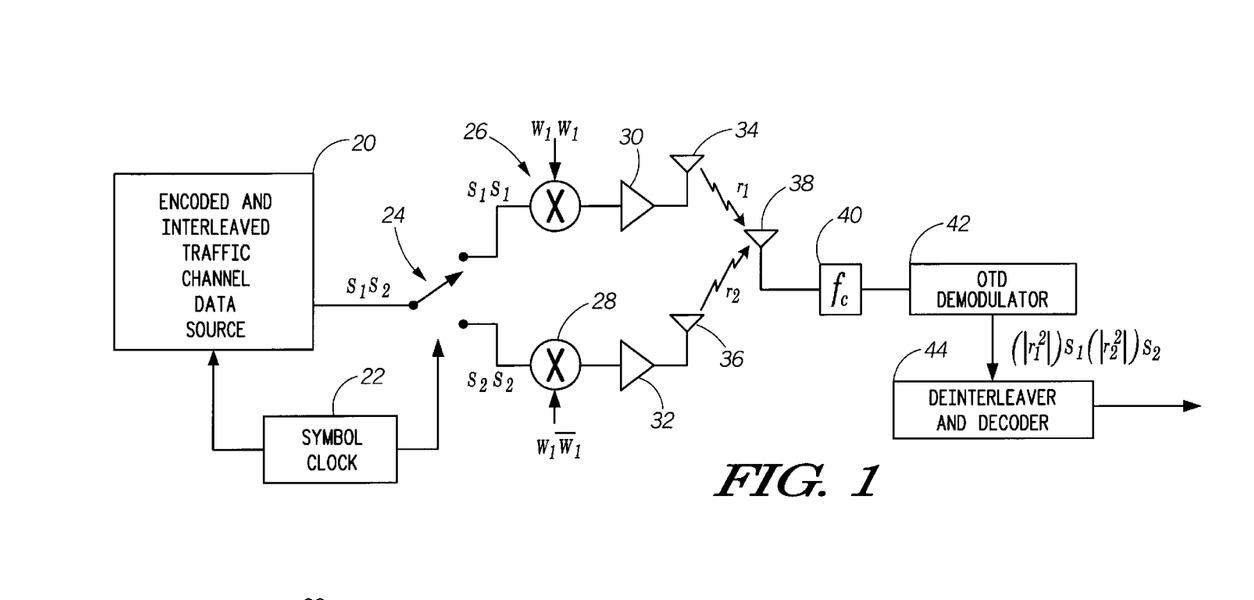
FIG. 1 depicts a high-level block diagram illustrating a transmitter and receiver for implementing orthogonal transmit diversity.

With reference now to FIG. 1, there is depicted a high-level block diagram of a transmitter and receiver for implementing an orthogonal transmit diversity system. As illustrated, data source 20 provides a stream of symbols, which may be encoded and interleaved. Such symbols may represent data in one or more traffic channels which are to be transmitted to the subscriber unit. Data in the traffic channels may represent voice, data, video, or other data a user desires to transport via the communication system.

The rate that symbols are output from data source 20 is controlled by symbol clock 22. Symbols $S_1$ and $S_2$ are shown coming from data source 20 wherein each symbol is output for 1 period of symbol clock 22, or a symbol period which may be described as the duration from $T_0$ to $T_1$.

The serial stream of symbols from data source 20 is coupled to commutator 24, which switches at the rate of symbol clock 22. Commutator 24 sends the first symbol to spreader 26, then switches to send the second symbol, $S_2$, to spreader 28. Subsequent symbols alternate each symbol period between spreader 26 and 28.

Spreaders 26 and 28 spread the symbols by multiplying them by a spreading code, such as a Walsh code. Because the symbol rate at spreaders 26 and 28 is half the rate that symbols are sourced from data source 20, a single Walsh code may be concatenated to form a new Walsh code at spreader 26, and concatenated with an inverted copy to form the spreading code at spreader 28. With these double-length Walsh codes used to spread half-rate symbols, the chip rate output by spreaders 26 and 28 remains the same as a transmission without OTD.

The outputs of spreaders 26 and 28 are coupled to radio frequency transmitters 30 and 32. These radio frequency transmitters may include a modulator, followed by an up converter for up converting the modulated signal to a selected carrier frequency, and an amplifier for providing suitable power for transmitting the radio frequency signal.

The outputs of radio frequency transmitters 30 and 32 are coupled to antennas 34 and 36 for simultaneously transmitting symbols $S_1$ and $S_2$. Because antennas 34 and 36 are spaced apart, the characteristics of the various paths or rays that the signals follow from each antenna to the subscriber unit may be measured separately, and described by coefficients shown as $r_1$, and $r_2$, where $r_1$ and $r_2$ are complex numbers that represent the gain and phase of the channel. Although $r_1$ and $r_2$ are treated here as single values, they may be vectors which describe the gain and phase of a plurality of resolvable multipath rays.

Antenna 38 is used by the subscriber unit to receive signals transmitted from antennas 34 and 36. The received signal is down converted an demodulated in down converter and demodulator 40 and decoded in OTD decoder 42.

The output of OTD decoder 42 is recovered symbols multiplied by the square of the magnitude of the channel coefficients $r_1$ and $r_2$, respectively. Further details of the operation of OTD decoder 42 are shown in FIG. 2, which is discussed below.

The OTD decoder outputs are coupled to deinterleaver and decoder 44 for the deinterleaving and decoding processes that corresponds to the encoding and interleaving processes performed in data source 20. The output of deinterleaver and decoder 44 is the traffic channel data. Transmit power is reduced for the same quality of service with the OTD diversity technique because different symbols experience different channel gains. This lowers the likelihood that both symbols will simultaneously experience a deep fade. This statistical unlikelihood that both symbols will be faded improves the decoder performance.

Figure 2:
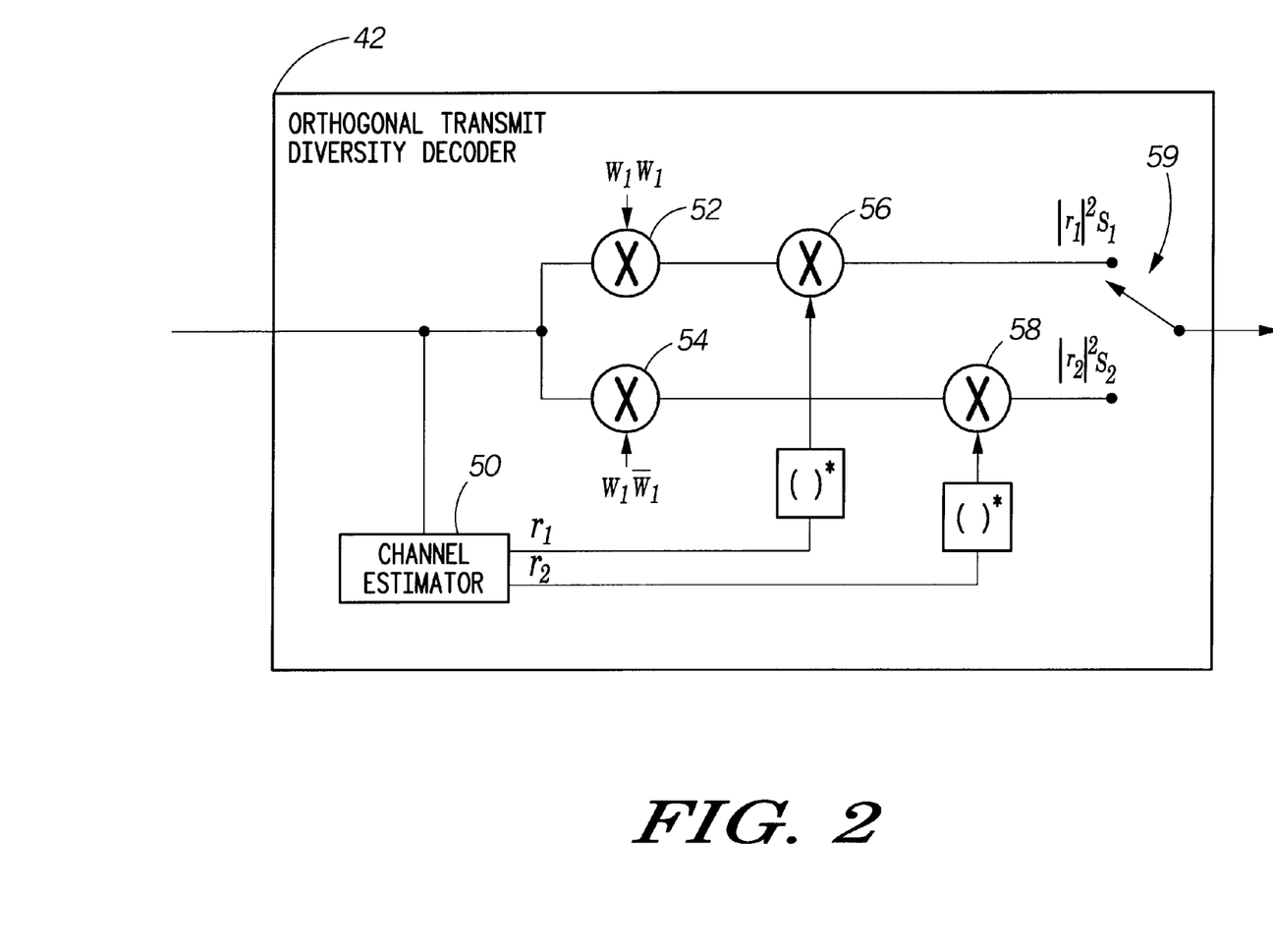
FIG. 2 depicts a schematic representation of orthogonal transmit diversity decoder, as shown in FIG. 1.

With reference now to FIG. 2 there is depicted a schematic representation of OTD decoder 42, which is used in FIG. 1. The input to OTD decoder 42 is a down-converted received signal, which was received from antenna 38. This signal contains traffic channels for all users along with pilot signals that may be used to estimate the channels from each transmit antenna. Channel estimator 50 evaluates the pilot signals and calculates channel coefficients $r_1$ and $r_2$.

In a preferred embodiment, despreaders 52 and 54 despread the received signal using a single Walsh code that has been concatenated, as in the transmitter, in order to recover symbols $S_1$ and $S_2$. Multipliers 56 and 58 multiply these recovered symbols by the conjugate of the channel estimates in order to compensate for gain and phase changes that occurred in the channel. Decommutator 59 is used to restore the symbol order and thereby double the symbol rate of the outputs from multipliers 56 and 58. The outputs of OTD decoder 42 are the symbols multiplied by the magnitude of the respective channel estimate squared.

Figure 3:
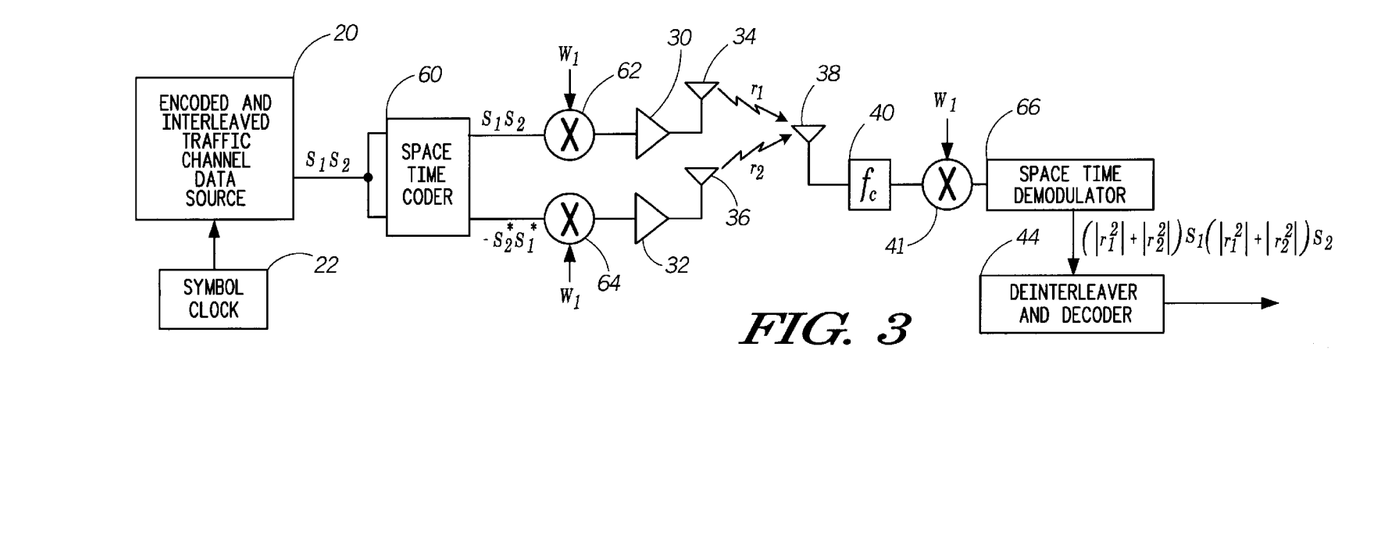
FIG. 3 depicts a space-time transmit diversity method and system for providing transmit diversity.

With reference now to FIG. 3, there is depicted another method and system for providing transmit diversity. FIG. 3 illustrates a space-time transmit diversity transmitter and receiver. As illustrated, data source 20 and symbol clock 22 provide symbols $S_1$ and $S_2$ to space-time coder 60. At the input, $S_1$ is received by space-time coder 60 during the period from $T_0$ to $T_1$. Symbol $S_2$ is received at the input of space-time coder 60 during the period from $T_1$ to $T_2$. Space-time coder 60, which is a special type of transform operation, has two outputs that provide transform signals to two branches of the transmitter.

At the first output of space-time coder 60, symbol $S_1$ is output during the symbol time from $T_0$ to $T_1$, followed by symbol $S_2$ from symbol time $T_1$ to $T_2$. The second output of space-time coder 60 outputs the negative complex conjugate of symbol $S_2$ during time $T_0$ to $T_1$, followed by the complex conjugate of symbol $S_1$ from the period $T_1$ to $T_2$.

The first and second space-time encoded data streams output by space-time coder 60 are then input into spreaders 62 and 64. As shown, spreaders 62 and 64 use Walsh code $W_1$. Note that the chip rate per symbol remains the same as in the OTD diversity transmitter.

Following the spreading function at spreaders 62 and 64, the spread data streams are modulated, up converted, and amplified by radio frequency transmitters 30 and 32.

The outputs of radio frequency transmitters 30 and 32 are coupled to antennas 34 and 36, which transmit the signals via channels that may be described with channel coefficients $r_1$ and $r_2$.

In the subscriber unit, antenna 38 receives the transmitted signals. The transmitted signals are then down converted using down converter and demodulator 40 and coupled to despreader 41, and thereafter to space-time decoder 66. The output of space-time decoder 66 is the estimated symbols multiplied by a factor calculated from the sum of the squares of the magnitude of the channel coefficients. These symbols and factors are then input into deinterleaver and decoder 44, which deinterleaves and decodes the symbols and outputs traffic channel data.

Although deinterleaver and decoder 44 are shown with the same reference numeral in FIG. 1 and FIG. 3 for both the OTD and STTD diversity schemes, respectively, it is important to understand that the deinterleaver and decoder function corresponds to the encoding and interleaving processes used in data source 20. Some performance improvements may be realized by selecting interleaving schemes specifically for a particular one of the diversity techniques. The reason that a different interleaving functions provides a different result is that the OTD diversity scheme uses commutator 24. The interleaving scheme for OTD should be selected so that adjacent symbols experience different fading through different channels.

Figure 4:
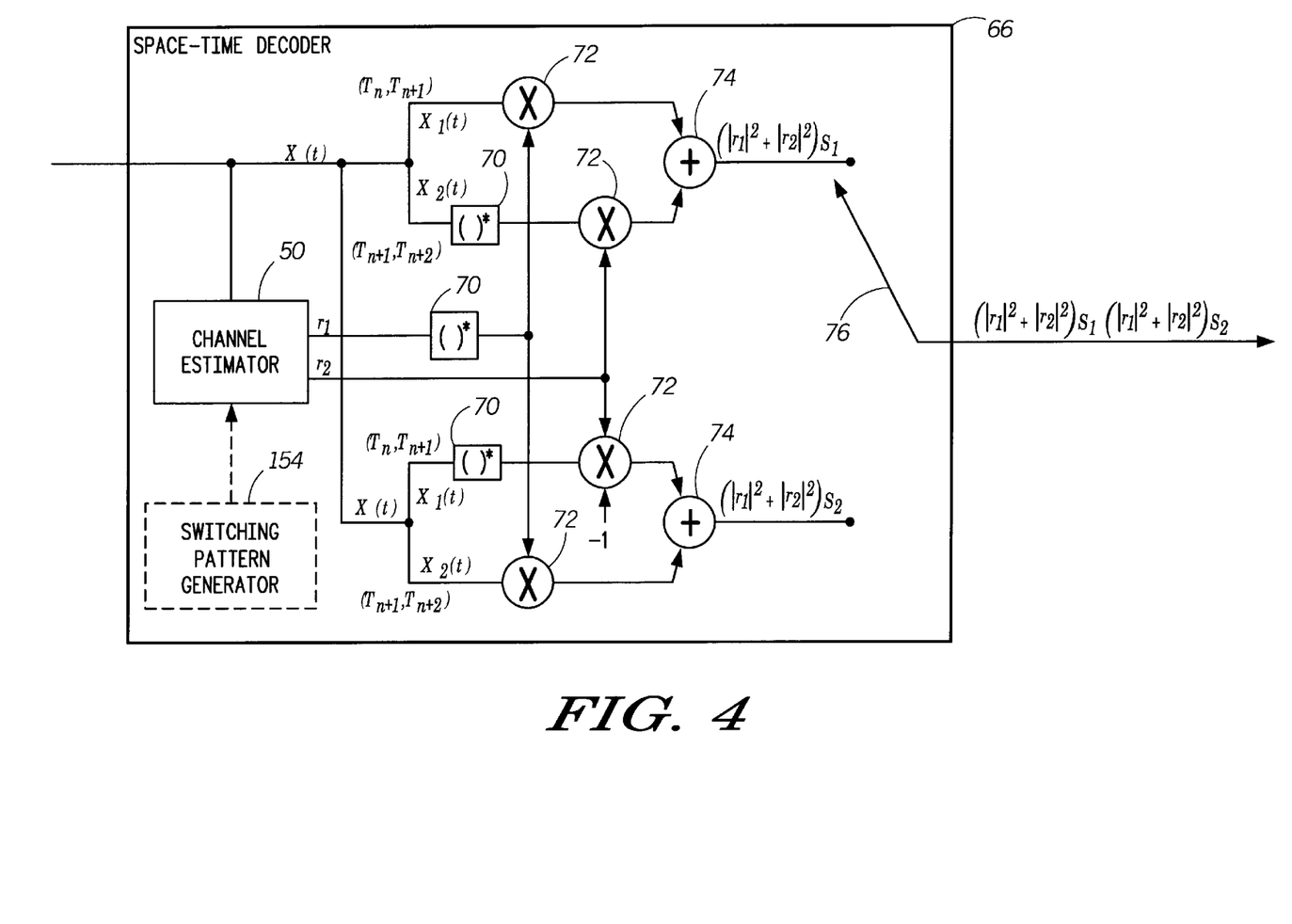
FIG. 4 depicts a high-level schematic diagram of a space-time decoder, as shown in FIG. 3.

With reference now to FIG. 4, there is depicted a high-level schematic diagram of a space-time decoder, as used in FIG. 3 at reference numeral 66.

The input to space-time decoder 66 is a down converted and despread received signal that was received from antenna 38. This signal contains traffic channel data for all users along with pilot signals that may be used to estimate the channels from each transmit antenna. Channel estimator 50 evaluates these pilot signals and calculates channel coefficients $r_1$ and $r_2$.

Complex conjugators 70 are used as shown to compute the complex conjugate of the down converted and despread signal, and compute the conjugate of channel coefficient $r_1$ for input to multipliers 72. Multipliers 72 are used to multiply the received signal, or the complex conjugate of the received signal, by channel coefficients $r_2$, or the complex conjugate of channel coefficients $r_1$. Adders 74 are used to add the output signals from multipliers 72 to produce signals that represent a symbol multiplied by a factor computed from both channel coefficients. These weighted symbols are then decommutated by decommutator 76 to produce the sequential output of the weighted symbols.

Note that signals labeled $x_1(t)$ are different they are derived from the signal x(t) at two different times, the times of two sequential symbols periods.

The two methods that are described above for providing transmit diversity use two antennas. Additional transmit diversity may be obtained by increasing the number of antennas. The orthogonal transmit diversity method may be easily implemented with more than two antennas, however merely adding antennas does not increase performance as much as other methods with the same number of antennas.

With regard to the transmitter that uses space-time transmit diversity, this technique is not easily expanded beyond two antennas without using additional system resources, such as Walsh codes or increasing the coding rate, which results in any gain in diversity being cancelled by the loss of capacity.

Therefore, it should be apparent that there is a need for an improved method and system for transmitting and receiving signals transmitted from an antenna array with transmit diversity techniques.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 5:
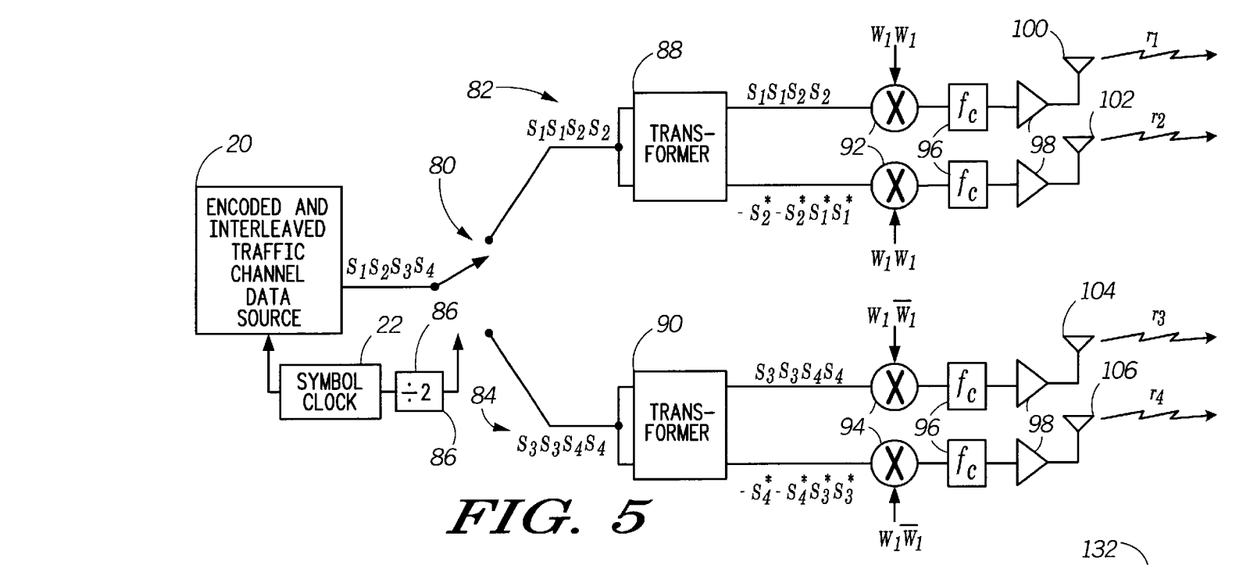
FIG. 5 depicts a system for transmitting signals from an antenna array using a transmit diversity technique in accordance with the method and system of the present invention.

With reference now to FIG. 5, there is depicted a system for transmitting signals from an antenna array using a transmit diversity technique in accordance with the method and system of the present invention. As shown, data source 20 provides a data stream of symbols, which may be encoded and interleaved. These symbols, shown as $S_1$ through $S_4$, are output at a rate determined by symbol clock 22.

The output of data source 20 is coupled to commutator 80, which, in this example, selects pairs of symbols that are output along branches 82 and 84 of the transmitter. Note that commutator 80 operates at one half of the rate of symbol clock 22, as shown by the output from divider 86. This means that the data rates along branches 82 and 84 are half the rate output from data source 20. Divider 86 divides by two because two symbols are selected for each branch. If any other number of symbols were selected for each branch, divider 86 would divide by the number of symbols selected.

Transformers 88 and 90 are coupled to the data streams output from commutator 80. Transformers 88 and 90 transform the pairs of symbols to produce two data streams that represent different mathematical combinations of the group of or symbols that was input into the transformer. The groups of symbols are transformed, or combined mathematically, in such a way that they may be mathematically separated in the receiver using the measured channel coefficients.

In a preferred embodiment, transformers 88 and 90 are implemented with space-time coders, such as a space-time coder 60 described with reference to FIG. 3. In the example shown in FIG. 5, space-time coders 88 and 90 each output first and second space-time encoded data streams, which are then coupled to the input of spreaders 92 in branch 82 and spreaders 94 in branch 84. Spreaders 92 use the same spreading code, which is shown in FIG. 5 as the concatenation of $W_1$ with $W_1$. Spreaders 94 use another spreading code formed by concatenating $W_1$ with the inverse of $W_1$. The spreading codes selected for spreaders 92 and spreaders 94 are orthogonal to one another in the sense the signals in branches 82 and 84 may be separated from one another at the receiver.

The output of spreaders 92 and spreaders 94, which may be referred to as antenna data streams, are then modulated, up converted, amplified, and transmitted from a selected antenna element in an antenna array. The modulation and up conversion function are shown in FIG. 5 at modulator and up converters 96. Amplification is performed by amplifiers 98, which are coupled to antennas 100 through 106.

Figure 6:
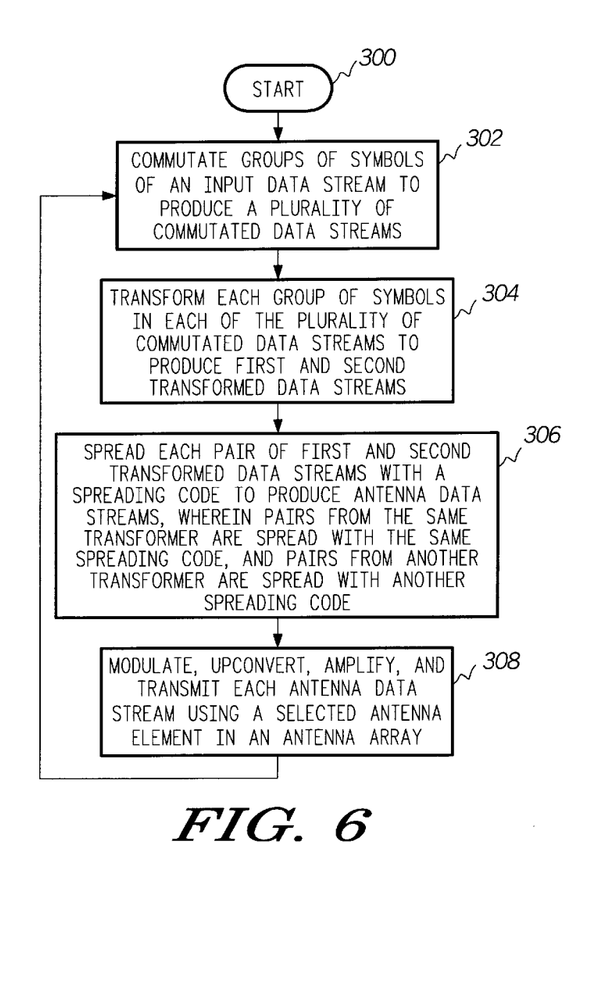
FIG. 6 depicts a high-level logic flowchart illustrating the method and operation of the transmitter depicted in FIG. 5 according to the method and system of the present invention.

Referring now to FIG. 6, there is depicted a high-level logic flowchart that illustrates the method and operation of the transmitter depicted in FIG. 5 according to the method and system of the present invention. As shown, the process starts at block 300 and thereafter passes to block 302 wherein the process commutates groups of symbols of an input data stream to produce a plurality of commutated data streams. This step may be implemented as shown in FIG. 5 with commutator 80 that commutates pairs of symbols to produce a plurality of commutated data streams, which are then input into space-time coders 88 and 90. Next, the process transforms each group of symbols in each of the plurality of commutated data streams to produce first and second transformed data streams, as illustrated at block 304. In a preferred embodiment, and as shown in FIG. 5, this transforming step may be implemented using space-time coders, such as space-time coders 88 and 90.

This transform operation may be represented mathematically as described below. The input vector is $$X=[S_1, S_2]$$

Where $S_1$ and $S_2$ are the (complex-valued) input symbols. The corresponding output vector is $$Y=[Y_1, Y_2]$$

Where $Y_1=[S_1, -S_2^*]^T$, $Y_2=[S_2, S_1]^T$, $[.]^T$ represents vector transpose operation, and $(.)^*$ denotes conjugation.

This transform is characterized by the fact that the commutated data streams input into the transformers may be recovered at the subscriber unit after passing through the radio frequency channel.

After transforming each commutated data stream, the process spreads each pair of first and second transformed data streams with a spreading code to produce antenna data streams, as depicted at block 306. In this spreading operation, the plurality of transformed data streams output by a single transformer are each spread with the same spreading code. Transformed data streams output by different transformers are spread with different spreading codes. This step is illustrated in FIG. 5 wherein the outputs from space-time coder 88 are both spread with the same spreading code at spreaders 92, while the outputs from space-time coder 90 are spread with another spreading code at spreaders 94.

Finally, each antenna data stream is modulated, up converted, amplified, and transmitted from a selected antenna element in an antenna array, as illustrated at block 308. This step is shown in FIG. 5 wherein modulator and up converters 96 represent the modulation and up-conversion steps. Amplifiers 98 increase the power of the signals so that they may be transmitted by antennas 100 through 106. As discussed later, pilot signals are added in the transmitter so that channel measurements can be made.

Figure 7:
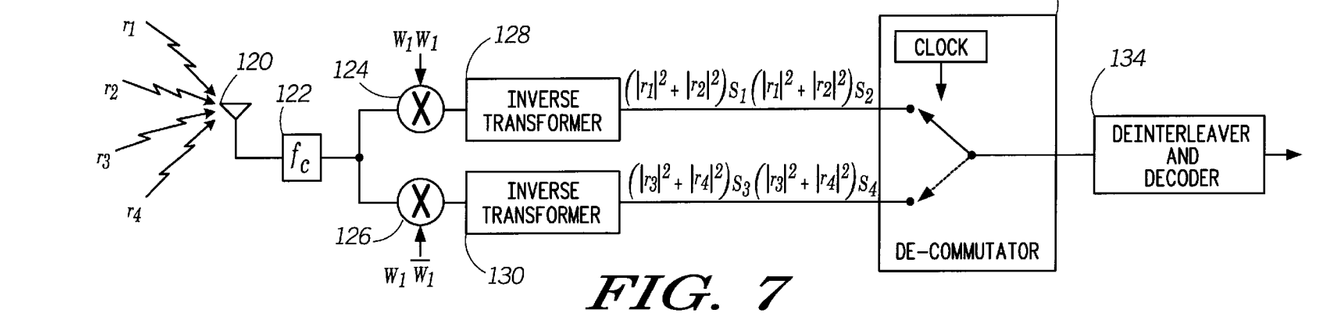
FIG. 7 depicts a subscriber unit for receiving and demodulating a signal transmitted by the transmitter of FIG. 5.

Referring now to FIG. 7, there is depicted a subscriber unit for receiving and demodulating a signal transmitted by the transmitter of FIG. 5. As illustrated, antenna 120 receives signals transmitted from antennas 100 through 106 (see FIG. 5), wherein each signal has traveled through a path or channel that may be described by channel coefficients $r_1$ through $r_4$. Signals from antenna 120 are coupled to down converter and demodulator 122, which removes the carrier from the signals and produces a baseband received signal.

The baseband received signal is coupled to the inputs of despreaders 124 and 126, which remove the spreading codes that were used at spreaders 92 and 94 in FIG. 5. These despreaders 124 and 126 are used to separate the baseband received signal into two signals that correspond to the signals in branches 82 and 84 of FIG. 5. The outputs of despreaders 124 and 126 are despread baseband received signals.

The despread baseband received signals are then coupled to inverse transformers 128 and 130. In a preferred embodiment, inverse transformers are implemented with STTD decoders, as shown in FIG. 4. However, in each embodiment of the invention, inverse transformers 128 and 130 perform the inverse operation of the operation performed in transformers 88 and 90 in FIG. 5. This inverse transform ideally has zero inter-symbol interference, however some transform operations may have some minimal residual inter-symbol interference.

In the preferred embodiment using the STTD decoder, the inverse transform mathematical operation may be described by the equation below. The received signals at two consecutive symbol periods are $X_1 = r_1 S_1 - r_2 S_2^*$ and $X_2 = r_1 S_2 + r_2 S_1^*$ Thus, transmitted symbol can be recovered as follows:

$S_1 = r_1^* X_1 + r_2 X_2^*$ and $S_2 = r_1^* X_2 - r_2 X_1^*$

Outputs from inverse transformers 128 and 130 are coupled to de-commutator 132, which reorders the symbols output by inverse transformers 128 and 130 to produce the original symbol order at the original symbol rate output by data source 20 (see FIG. 5). Note that in the example shown in FIG. 7, de-commutator 132 operates at one half the symbol rate to produce an output at the full symbol rate. If symbols are grouped in groups larger than pairs of symbols, de-commutator 132 would operate at the symbol rate divided by the number of symbols in a group.

The output of de-commutator 132 is coupled to deinterleaver and decoder 134. Deinterleaver and decoder 134 deinterleaves and decodes the symbols in operations that match the interleaving and encoding methods used in data source 20 (see FIG. 5). The output of deinterleaver and decoder 134 is a symbol data stream representing the traffic channel data.

Two type of gains may be realized from the architecture shown in FIG. 7. One type of gain is a path gain, which is realized because paths $r_1$ and $r_2$ are combined in a coherent way, as shown by the factors in the outputs from inverse transformers 128 and 130. Additionally, decoding gain may be realized because the circuit in FIG. 7 has multiple branches, wherein the branches are distinguished by a despreader coupled to an inverse transformer. The signals processed in these branches have traveled through different paths, which makes it statistically less likely that the signals on both of the branches will experience a deep fade at the same time.

Figure 8:
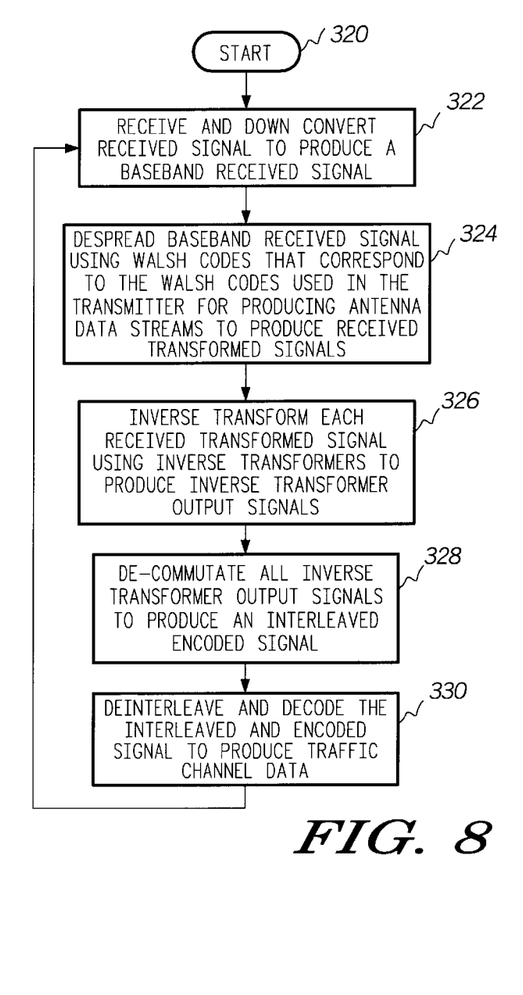
FIG. 8 depicts a high-level logic flowchart illustrating the method and operation of the subscriber unit shown in FIG. 7 in accordance with the method and system of the present invention.

Referring now to FIG. 8, there is depicted a high-level logic flowchart that illustrates the method and operation of the subscriber unit shown in FIG. 7 in accordance with the method and system of the present invention. As illustrated, the process begins at block 320 and thereafter passes to block 322 wherein the process receives and down-converts a received signal to produce a baseband received signal. This step may be implemented with down converter and demodulator 122, as shown in FIG. 7.

Next, the process despreads the baseband received signal using a plurality of Walsh codes that correspond to the Walsh codes used in the transmitter for producing the antenna data streams, as illustrated at block 324. The output of the despreaders are referred to as received transformed signals, and the despreading operation is shown in FIG. 7 at despreaders 124 and 126.

The process next inverse transforms each received transformed signal using a plurality of inverse transformers to produce inverse transformer output signals, as depicted at block 326. In a preferred embodiment, this step is implemented with STTD decoders coupled to the outputs of each despreader 124 and 126 (see FIG. 7). The mathematical operation performed in inverse transformers 128 and 130 is discussed with reference to FIG. 7.

Next, the inverse transformer output signals are decommutated to produce an interleaved encoded signal, as illustrated at block 328. This step is performed by de-commutator 132, as shown in FIG. 7.

Finally, the interleaved encoded signal is deinterleaved and decoded to produce the traffic channel data signal, as depicted at block 330. The de-interleaving and decoding process compliments the encoding and interleaving process that may have been performed on the input data stream provided by data source 20 (see FIG. 5). Following block 330, the process iteratively returns to block 322, wherein a new signal is received and demodulated and decoded in a similar manner.

Figure 9:
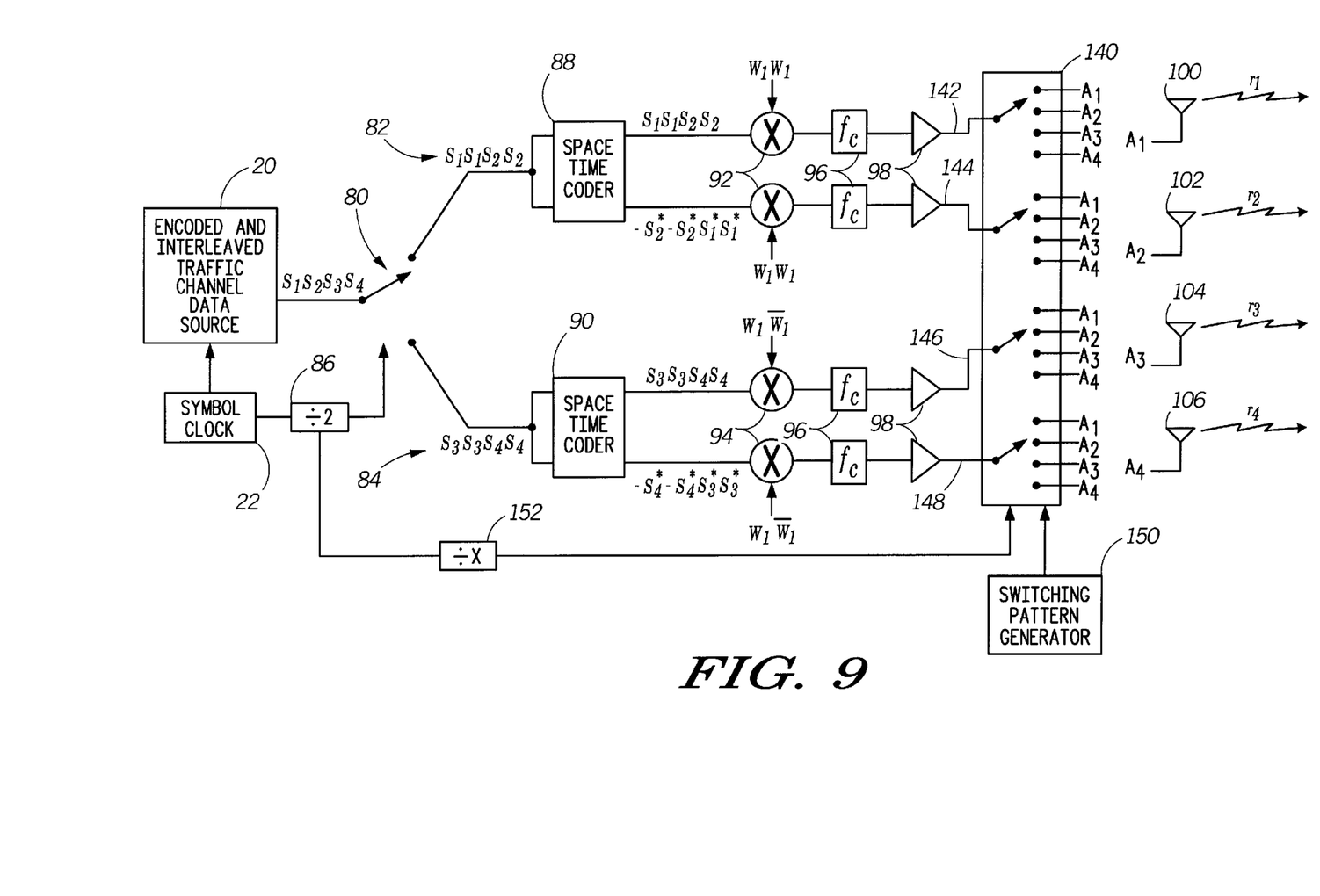
FIG. 9 depicts an alternative embodiment of a transmitter in accordance with the method and system of the present invention.

With reference now to FIG. 9, there is depicted an alternative embodiment of a transmitter in accordance with the method and system of the present invention. The transmitter shown in FIG. 9 is similar to the transmitter shown in FIG. 5, and similar portions of the schematic are shown with the same reference numerals. The performance of the transmitter in FIG. 9 is further improved by the addition of antenna selector 140, which is coupled between amplifiers 98 and antennas 100 through 106. Antenna selector 140 may couple the output of any amplifier 98 to any antenna 100 through 106. Preferably, the output of each amplifier 98 is coupled exclusively to one of the antennas at any given time.

In a preferred embodiment, antenna signals 142–148 are coupled to selected antennas by antenna selector 140 in a switching pattern shown in the table below.

| Time Period | | Signal 142 | Signals 144 | Signal 146 | Signal 148 |
| --- | --- | --- | --- | --- | --- |
| 0 | $T_x$ | $A_1$ | $A_2$ | $A_3$ | $A_4$ |
| $T_x$ | $2 T_x$ | $A_1$ | $A_3$ | $A_2$ | $A_4$ |
| $2 T_x$ | $3 T_x$ | $A_1$ | $A_4$ | $A_2$ | $A_3$ |

The switching pattern may be stored in switching pattern generator 150, which is coupled to antenna selector 140. While the antenna switching pattern shown in Table 1 is a periodic switching pattern with three states, other methods of switching with a larger number of states is possible. For example, instead of periodic switching, random switching may be used. Whatever pattern and timing of switching is selected, knowledge of this switching pattern is required in the subscriber unit so that the proper channel coefficients may be multiplied by the proper symbols in the symbol demodulator.

The rate at which antenna selector 140 changes is synchronized with symbol clock 22 and determined by the output of divider 152. Thus, the antenna switching rate is slower than the symbol rate.

The subscriber unit used to receive signals transmitted by the transmitter of FIG. 9 is similar to the receiver architecture shown in FIG. 7. However, in order to receive a signal that uses antenna switching as shown in FIG. 9, each inverse transformer must include a channel estimator that can select the proper channel to estimate based on the antennas selected at the transmitter. In a preferred embodiment, the inverse transformer is a space-time decoder, such as space-time decoder 66 shown in FIG. 4. When antenna signals 142 and 144 are coupled to antennas $A_1$ and $A_2$, respectively, channel estimator 50 estimates channel coefficients $r_1$ and $r_2$. For antenna signals 146 and 148, channel estimator 50 in space-time decoder 66 would estimate channel coefficients $r_3$ and $r_4$. As new combinations of antennas are selected by antenna selector 140, channel estimator 50 may estimate, for example, $r_1$ and $r_3$. It is important that channel estimator 50 in space-time decoder 66 estimate channel coefficients for the channels used by one of the transformers in the transmitter. Optional switching pattern generator 154 is shown in space-time decoder 56 (See FIG. 4.) for the purpose of selecting the proper channel coefficients.

Figure 10:
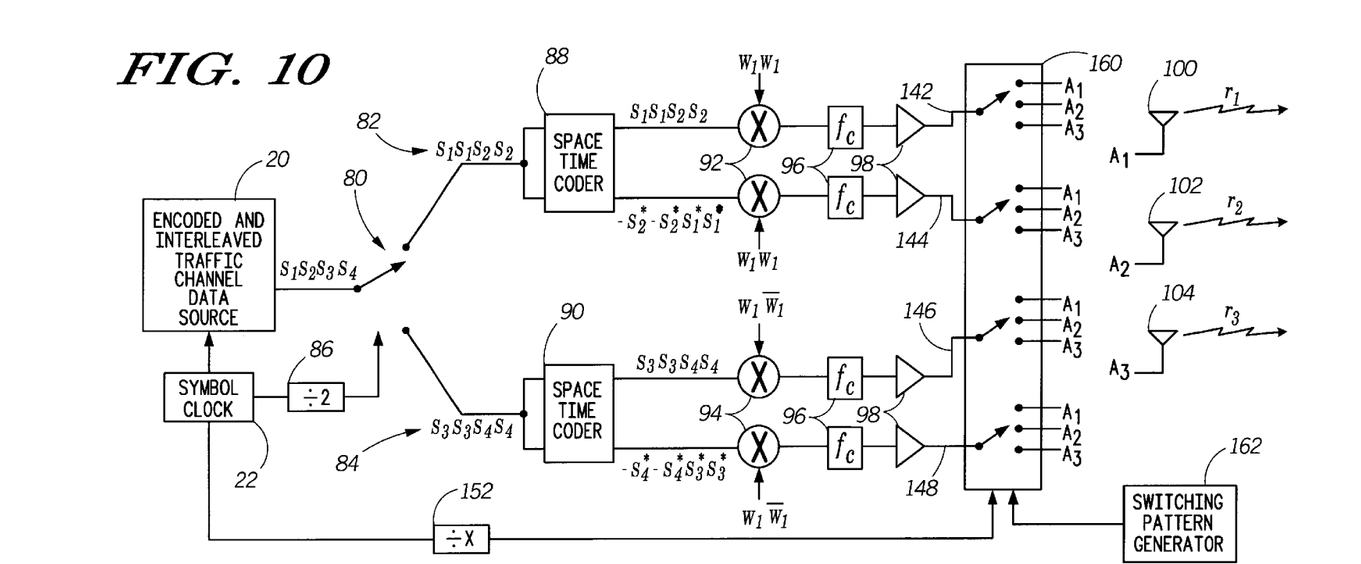
FIG. 10 depicts another embodiment of a transmitter having selected antenna outputs.

With reference now to FIG. 10 there is depicted yet another embodiment of a transmitter having switched or selected antenna outputs. The transmitter depicted in FIG. 10 is similar to that depicted in FIG. 9, however antenna selector 160 is coupled to only three antennas, antennas 100 through 104. Because antenna selector 160 is connected to only three antennas, switching pattern generator 162 must accommodate a switching pattern which maps four antenna signals 142–148 into three antennas 100 through 104. In this embodiment, more than one antenna signal is mapped to a selected antenna.

Figure 11:
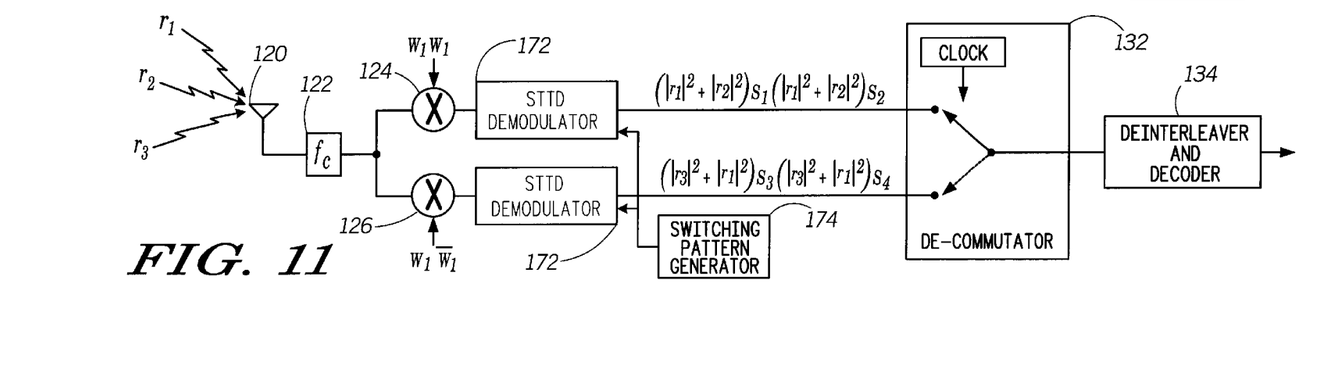
FIG. 11 depicts a receiver which may be used in a subscriber unit to receive signals transmitted by the transmitter shown in FIG. 10.

Referring now to FIG. 11, there is depicted a receiver which may be used in a subscriber unit to receive signals transmitted by the transmitter shown in FIG. 10. As shown, antenna 120 receives signals transmitted from antennas 100 through 104 (see FIG. 10) and couples the received signals to down converter and demodulator 122. The output of down converter and demodulator 122 is a baseband received signal.

The baseband received signal is coupled to despreaders 124 and 126, wherein the baseband signal is despread using two different despreading codes, as shown. The two despreading codes correspond to spreading codes used by spreaders 92 and 94 in the transmitter shown in FIG. 10.

The outputs of despreaders 124 and 126, which may be referred to as despread baseband received signals, are coupled to inverse transformers 172, respectively. Inverse transformers 172 perform the inverse operation of that performed in transformers 88 and 90 (see FIG. 10) except that inverse transformers 172 have specific knowledge of the switching pattern used in antenna selector 160 so that it may calculate the proper channel coefficients. This switching pattern is provided to inverse transformers 172 by switching pattern generator 174. Switching pattern generator produces a pattern similar to that produced in switching pattern generator 162 of FIG. 10.

The inverse transformer output signals are coupled to de-commutator 132 which reorders the channel detected symbols from the two branches of the receiver. In this example, where symbols are grouped in pairs, the clock in de-commutator 132 runs at one half the symbol rate. The output of de-commutator 132 is an interleaved encoded signal.

The interleaved encoded signal is input into deinterleaver and decoder 134, which deinterleaves and decodes the symbols according the appropriate de-interleaving and decoding schemes that compliment the schemes used in data source 20.

The coefficients shown in FIG. 11 at the outputs of inverse transformers 172 represent the signals output when antenna signal 142 is coupled to antenna 100, antenna signal 144 is coupled to antenna 102, antenna signal 146 is coupled to antenna 104, and antenna signal 148 is coupled to antenna 100.

Figures 12, 14:
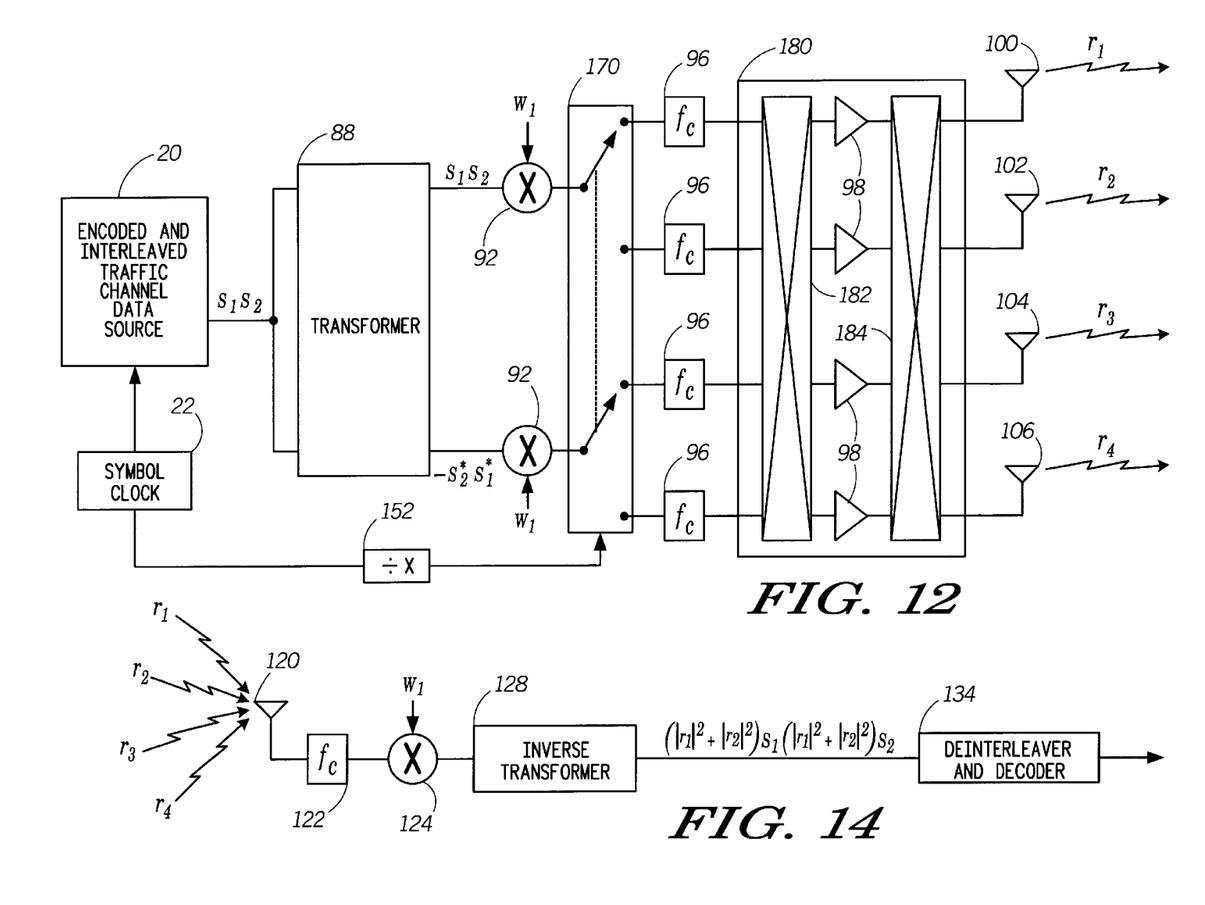
FIG. 12 depicts a transmitter for providing signals with transmit diversity.
FIG. 14 depicts a receiver for receiving and demodulating the signals transmitted with transmit diversity from the transmitter shown in FIG. 12.

With reference now to FIG. 12, there is depicted a transmitter for providing signals with transmit diversity. As shown, data source 20 provides an encoded and interleaved traffic channel data source, of which two symbols are shown as symbols $S_1$ and $S_2$. The rate of the output from data source 20 is controlled by symbol clock 22. The output of data source 20 is coupled to the input of transformer 88 which transforms groups of symbols to produce a plurality of transformed data streams as an output. In a preferred embodiment, transformer 88 may be implemented with a space-time coder, similar to the space-time coder discussed above with reference to FIG. 3.

The plurality of transformed data streams output by transformer 88 are coupled to a plurality of spreaders, shown in FIG. 12 as spreaders 92. In the transmitter shown in FIG. 12, the outputs of transformer 88 are spread with the same spreading code.

The output of spreaders 92 may be referred to as antenna data streams because they are ready for modulation, up conversion, amplifying, and transmitting via an antenna. In the example shown in FIG. 12, these antenna data streams are input into commutator 170, which commutates the signal at a divided symbol clock rate determined by divider 152. In this example, commutator 170 switches antenna data streams between two different paths selected for each data stream, which produces four commutated antenna data streams.

In a preferred embodiment, the switches in commutator 170 select an output for a period of two symbol times. Other clock rates may be used, wherein the clock has a period of N times the number of symbols in a group, times the symbol time.

The outputs of commutator 170 are coupled to a selected modulator and up converter 96, which modulates the signal and up converts the signal to the carrier frequency. Note that when an output of commutator 170 is not connected to modulator and up converter 96, the input to that modulator and up converter is set to zero.

Outputs from modulator and up converter 96 are coupled to inputs of a hybrid matrix amplifier 180 for amplifying the signals so that they may be transmitted from antennas 100 through 106. Hybrid matrix amplifier 180 includes transformer 182 having outputs coupled to amplifiers 98. Each amplifier 98 has an output coupled to an input of an inverse transformer 184, which performs a complimentary transform to the transform performed in transformer 182. Transformer 182 and inverse transformer 184 are preferably implemented with fourier matrix transformers. The advantage of using hybrid matrix amplifier 180 is that all amplifiers 98 equally share the power amplifying function, even when some inputs to hybrid matrix amplifier 180 are set to zero.

The outputs of hybrid matrix amplifier 180 are coupled to antennas 100 through 106 for transmitting signals over various channels with transmit diversity.

Figure 13:
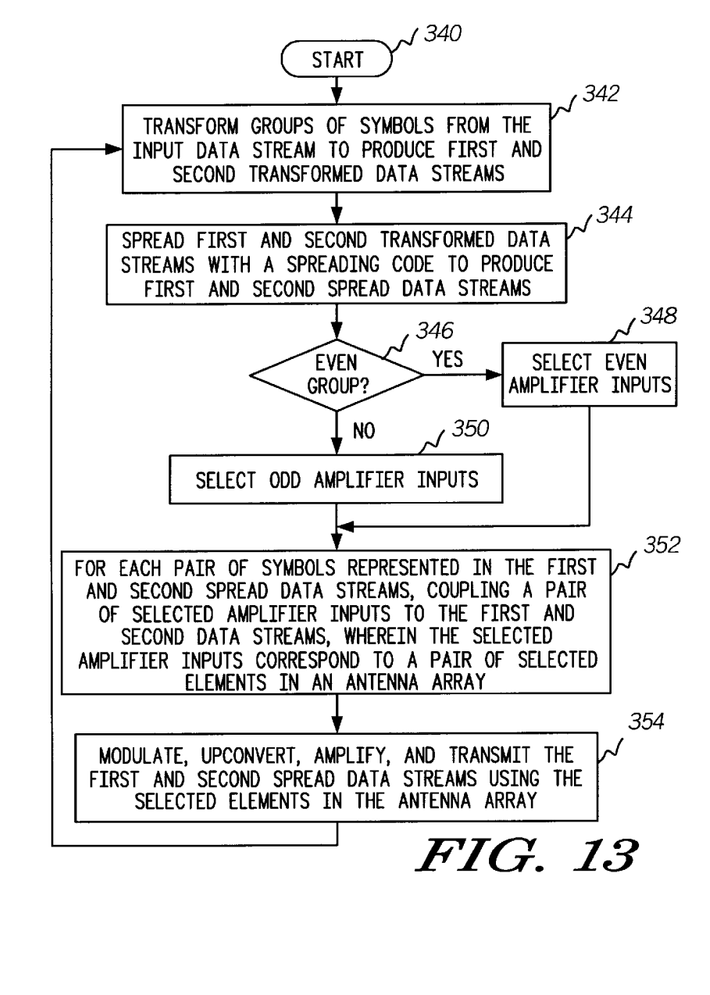
FIG. 13 depicts a high-level logic flowchart illustrating the method and system operation of the transmitter shown in FIG. 12.

Referring now to FIG. 13, there is depicted a high-level logic flowchart which illustrates the method and system operation of the transmitter shown in FIG. 12. As illustrated, the process begins at block 340 and thereafter passes to block 342 wherein the process transforms groups of symbols from the input data stream to produce a plurality of transformed data streams. This step may be performed as shown in FIG. 12 with transformer 88. In a preferred embodiment, the transformer is a space-time transformation that produces first and second transformed data streams, as discussed above with reference to FIG. 3.

Next, the process spreads the first and second transformed data streams with a spreading code to produce first and second spread data streams, as illustrated at block 344. This step may be implemented with spreaders, as shown in FIG. 12 at reference numerals 92.

Next, the process determines whether or not the present group is an even group of symbols, as depicted at block 346. Note that in the present example, commutator 170 has two states which may be referred to as an even state and an odd state. If commutator 170 had more than two states, the process would determine the current state of the N states at block 346. The present example is simplified by using only two states.

If the process determines that the present group is an even group, the process selects the even amplifier inputs, as depicted at block 348. However, if the process determines that the present group is an odd group, the process selects the odd amplifier inputs, as illustrated at block 350.

Following the selection of the amplifier inputs, the process couples each pair of symbols represented in the first and second spread data streams to a pair of amplifier inputs, wherein the amplifier inputs correspond to pair of a selected elements in an antenna array, as depicted at block 346. This step is implemented using a commutator, such as commutator 170 shown in FIG. 12. Thus, the commutator connects a pair of a transformed and spread symbols from the outputs of spreaders 92 to a pair of inputs of an amplifier array, or hybrid matrix amplifier.

After the amplifier inputs have been selected and coupled, the process modulates, up converts, amplifies, and transmits the first and second spread data streams using the selected elements of the antenna array, as depicted at block 354. Note that in a preferred embodiment of the present invention, these signals are amplified using a hybrid matrix amplifier, as shown in FIG. 12 at reference numeral 180. The hybrid matrix amplifier is selected because it reduces the peak-to-average value of the signals experienced by each amplifier in the hybrid matrix amplifier array.

Note that while modulator and up converters 96 are shown at the outputs of commutator 170, a pair of modulator and up converters 96 may be used prior to the input of commutator 170.

Following block 354, the process iteratively returns to block 342 to process the next group of symbols.

With reference now to FIG. 14, there is depicted a receiver for receiving and demodulating the signals transmitted with transmit diversity from the transmitter shown in FIG. 12. As illustrated, antenna 120 receives signals via channels that may be described with channel coefficients $r_1$ through $r_4$. These signals are coupled to down converter and demodulator 122, which down converts and demodulates the signals to produce a baseband received signal.

The baseband received signal is input into despreader 124 which despreads and produces a despread baseband received signal. Despreader 124 uses a despreading code similar to the spreading code used in spreaders 92 in FIG. 12.

The despread baseband received signal is input into inverse transformer 128, which provides an inverse transform function similar to that discussed with reference to FIG. 4. The output of inverse transformer 128 is symbols $S_1$ and $S_2$ multiplied by coherently combined channel gains. The outputs shown in FIG. 14 occupies two symbol times. In the next two symbol times, as a result of antenna switching at commutator 170, the symbols will travel through different channels, which may be described by channel coefficients $r_3$ and $r_4$. Receiving different symbols through different channels provides interleaving gain. Receiving the same symbol through multiple channels provides path diversity gain.

In a preferred embodiment, inverse transformer 128 may be implemented with a space-time decoder, similar to that shown in FIG. 4.

The output of inverse transformer 128 is coupled to deinterleaver and decoder 134. Deinterleaver and decoder 134 deinterleaves and decodes the received symbols in a manner suitable for recovering traffic channel symbols provided at data source 20 in FIG. 12.

For the purpose of channel estimation, the transmitter shown in FIG. 12 may transmit either two pilots mixed with the signals output from transformer 88, or four pilots, wherein each antenna element 100 through 106 has its own pilot. If pilot signals are mixed with the first and second transformed data streams, inverse transformer 128 need not know the switching pattern of commutator 170. If continuous pilots are added on each antenna element 100 through 106, then inverse transform 128 will need to know the switching pattern and rate of switching in the transmitter of FIG. 12.

Figure 15:
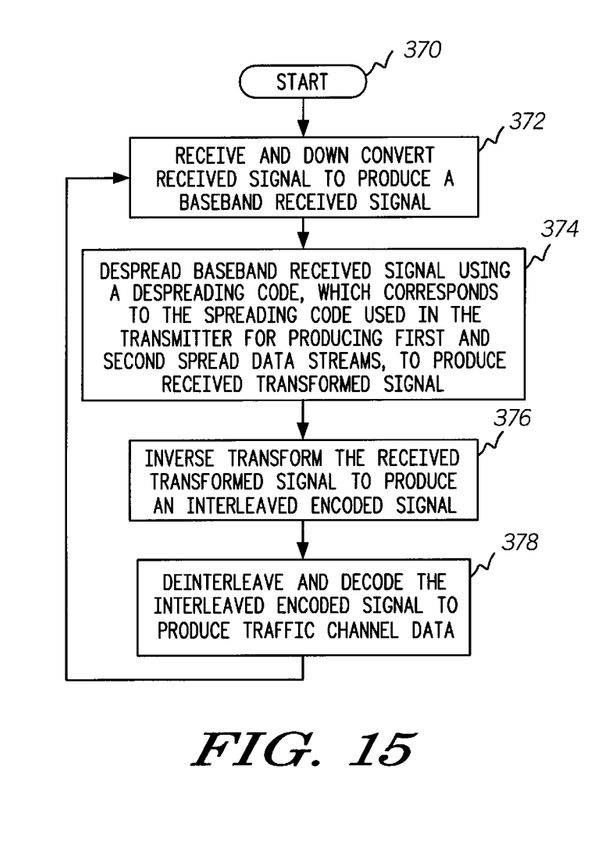
FIG. 15 depicts a high-level logic flowchart that shows the method and operation of the diversity receiver shown in FIG. 14.

With reference now to FIG. 15, there is depicted a high-level logic flowchart that shows the method and operation of the diversity receiver shown in FIG. 14. As illustrated, the process begins at block 370 and thereafter passes to block 372 wherein the process receives and down converts a received signal to produce a baseband received signal.

Next, the process despreads the baseband receive signal using a despreading code to produce received transformed signals, as illustrated at block 374. The despreading code used in this step corresponds to the spreading code used in the transmitter for producing the first and second spread data streams with spreaders 92 (see FIG. 12). This despreading step may be performed by despreader 124 as shown in FIG. 14.

Next, the process performs an inverse transform operation on the received transform signal to produce an interleaved encoded signal, as depicted at block 376. This inverse transform step may be performed by inverse transformer 128, which is shown in FIG. 14. In a preferred embodiment, the inverse transformer is an inverse space-time transformer, such as shown and described with reference to FIG. 4.

Finally, the process deinterleaves and decodes the interleaved encoded signal to produce traffic channel data output. The de-interleaving and decoding processes are selected to deinterleave and decode the processes used in data source 20 (see FIG. 12).

Figure 16:
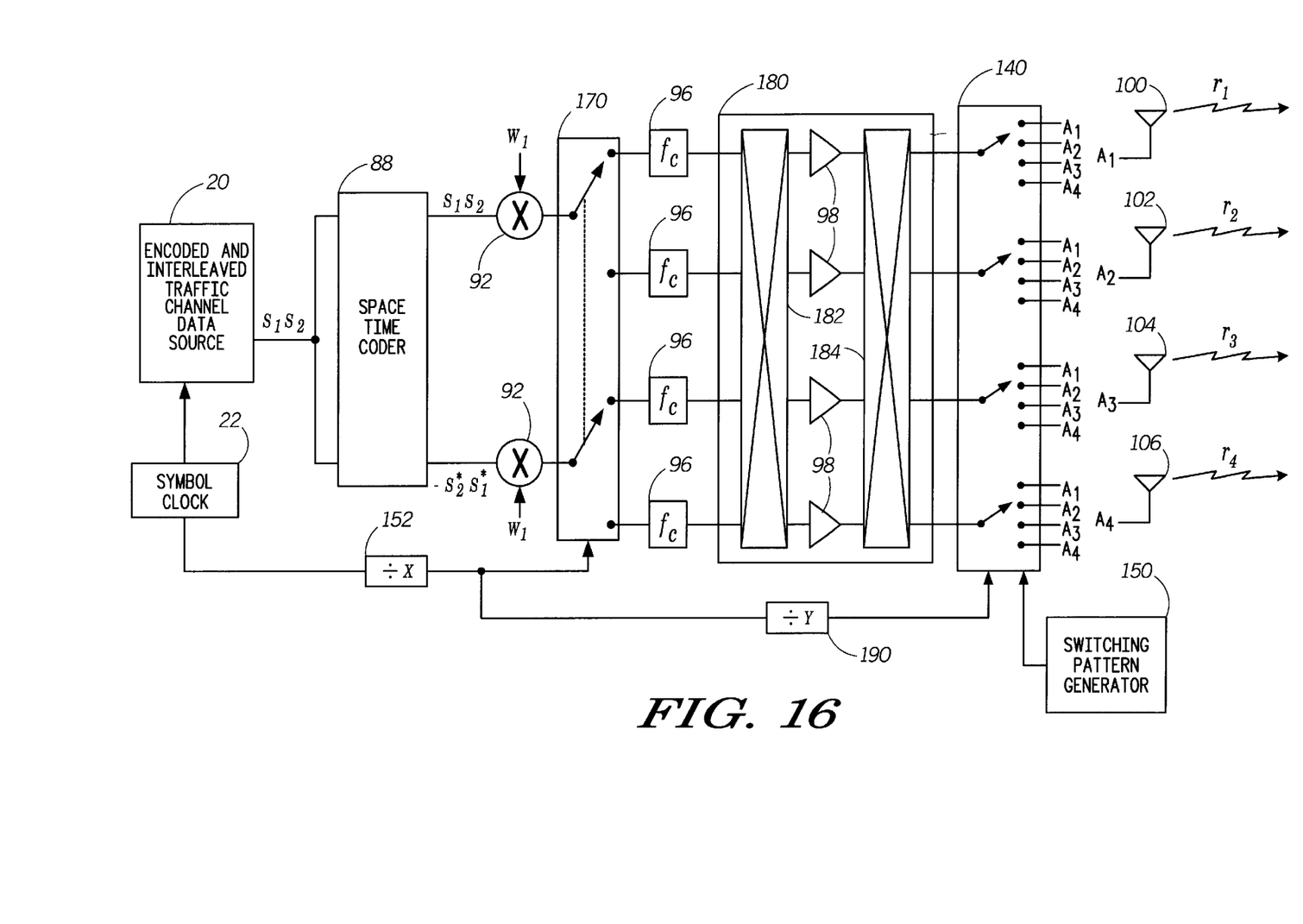
FIG. 16 depicts a transmitter for transmitting diversity signals that has antenna selection.

And finally, referring to FIG. 16, there is depicted a diversity signal transmitter that is similar to the transmitter shown in FIG. 12. The transmitter shown in FIG. 16 includes antenna switching to provide additional transmit diversity. In FIG. 16, antenna selector 140 is coupled to the outputs of hybrid matrix amplifier 180. Within antenna selector 140 any input may be coupled to any antenna output, as directed by switching pattern generator 150. The rate of antenna selection is determined by symbol clock 22 after it has been divided at divider 152 and further divided at divider 190. Thus, antenna selection occurs at a rate equal to or slower than the switching in commutator 170. The pattern output by switching pattern generator 150 may be the pattern shown in Table 1.

In order to show the present invention conceptually, antenna selectors 140 and 160 in FIGS. 9, 10, and 16 have been shown at the outputs of amplifiers 98 or at the output of hybrid matrix amplifier 180. The switching performed by these antenna selector is preferably implemented on a baseband signal, such as the baseband signals following spreaders 92 and 94 in FIGS. 9 and 10, and the baseband signal following commutator 170 in FIG. 16.

The foregoing description of a preferred embodiment of the invention has been presented for the purpose of illustration and description. It is not intended to be exhaustive or to limit the invention to the precise form disclosed. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the which they are fairly, legally, and equitably entitled.

What is claimed is:

1. A method for transmitting data from a transmitter to a receiver in a wireless communication system, wherein the transmitter uses an antenna array to transmit a signal having transmit diversity, the method comprising the steps of:

commutating groups of symbols of an input data stream to produce first and a second commutated data streams;

space-time coding the first commutated data stream to produce first and second transformed data streams;

space-time coding the second commutated data stream to produce third and fourth transformed data streams;

spreading each transformed data stream with a selected one of a plurality of spreading codes to produce a plurality of antenna signals; and transmitting each of the plurality of antenna signals using a selected one of a plurality of spaced apart antennas, wherein the plurality of spaced apart antennas are spaced apart to provide transmit diversity.

2. The method for transmitting data according to claim 1 wherein the step of commutating groups of symbols of an input data stream to produce a plurality of commutated data streams further includes:

selecting an N-symbol group of an input data stream, where N is greater than or equal to 1;

outputting the N-symbol group at a first commutator output to produce the first commutated data stream;

selecting a second N-symbol group of the input data stream; and outputting the second N-symbol group at a second commutator output to produce the second commutated data stream.

3. The method for transmitting data according to claim 1 wherein the step of space-time coding a first commutated data stream to produce first and second transformed data streams further includes:

in response to an input of the first commutated data stream having symbols $S_1S_1S_2S_2$, outputting, during a first period, symbols $S_1S_1$ from a first transform output, and outputting a negative complex conjugate of symbols $S_2S_2$ from a second transform output; and outputting, during a second period, symbols $S_2S_2$ from the first transform output, and outputting a complex conjugate of symbols $S_1S_1$ from the second transform output.

4. The method for transmitting data according to claim 1 wherein the step of transmitting each of the plurality of antenna signals using a selected one of a plurality of spaced apart antennas further includes modulating, upconverting, amplifying, and transmitting each of the plurality of antenna signals using a selected one of a plurality of spaced apart antennas, wherein the plurality of spaced apart antennas are spaced apart to provide transmit diversity.

5. The method for transmitting data according to claim 1 wherein the step of transmitting each of the plurality of antenna signals using a selected one of a plurality of spaced apart antennas further includes selecting different antennas in the antenna array for transmitting each of the plurality of antenna signals.

6. The method for transmitting data according to claim 5 wherein the step of periodically selecting different antennas in the antenna array for transmitting each of the plurality of antenna signals further includes periodically selecting different antennas in the antenna array for transmitting each of the plurality of antenna signals according to an antenna switching pattern that is synchronized with a symbol clock divided by an integer.

7. A system for transmitting data from a transmitter to a receiver in a wireless communication system, wherein the transmitter uses an antenna array to transmit a signal having transmit diversity, the system comprising:

a commutator for commutating groups of symbols of an input data stream to produce first and a second commutated data streams;

a first space-time coder for space-time coding the first commutated data stream to produce first and second transformed data streams;

a second space-time coder for space-time coding the second commutated data stream to produce third and fourth transformed data streams;

spreaders for spreading each transformed data stream with a selected one of a plurality of spreading codes to produce a plurality of antenna signals; and transmitters for transmitting each of the plurality of antenna signals using a selected one of a plurality of spaced apart antennas, wherein the plurality of spaced apart antennas are spaced apart to provide transmit diversity.

8. The system for transmitting data according to claim 7 wherein the commutator for commutating groups of symbols of an input data stream to produce a plurality of commutated data streams further includes:

means for selecting an N-symbol group of an input data stream, where N is greater than or equal to 1;

means for outputting the N-symbol group at a first commutator output to produce the first commutated data stream;

means for selecting a second N-symbol group of the input data stream; and means for outputting the second N-symbol group at a second commutator output to produce the second commutated data stream.

9. The system for transmitting data according to claim 7 wherein the first space-time coder for space-time coding a first commutated data stream to produce first and second transformed data streams further includes:

means for outputting, during a first period, symbols $S_1S_1$ from a first transform output, and outputting a negative complex conjugate of symbols $S_2S_2$ from a second transform output in response to an input of the first commutated data stream having symbols $S_1S_1S_2S_2$; and means for outputting, during a second period, symbols $S_2S_2$ from the first transform output, and outputting a complex conjugate of symbols $S_1S_1$ from the second transform output.

10. The system for transmitting data according to claim 7 wherein the transmitters for transmitting each of the plurality of antenna signals using a selected one of a plurality of spaced apart antennas further include means for modulating, upconverting, amplifying, and transmitting each of the plurality of antenna signals using a selected one of a plurality of spaced apart antennas, wherein the plurality of spaced apart antennas are spaced apart to provide transmit diversity.

11. The system for transmitting data according to claim 7 wherein the transmitters for transmitting each of the plurality of antenna signals using a selected one of a plurality of spaced apart antennas further include means for selecting different antennas in the antenna array for transmitting each of the plurality of antenna signals.

12. The system for transmitting data according to claim 11 wherein the means for selecting different antennas in the antenna array for transmitting each of the plurality of antenna signals further includes means for periodically selecting different antennas in the antenna array for transmitting each of the plurality of antenna signals according to an antenna switching pattern that is synchronized with a symbol clock divided by an integer.

13. A method for receiving data in a receiver in a wireless communication system, wherein the data has been transmitted from a transmitter using an antenna array to transmit a signal having transmit diversity, the method comprising the steps of:

receiving and down-converting a received signal to produce a baseband received signal;

despreading the baseband received signal using despreading codes that correspond to spreading codes used in the transmitter to produce antenna signals that are transmitted from antennas in the antenna array, wherein the despreading produces received transformed signals;

space-time decoding each received transformed signal to produce inverse transformer output signals; and de-commutating all inverse transformer output signals to produce a signal containing traffic channel data.

14. The method for receiving data according to claim 13 wherein the step of de-commutating all inverse transformer output signals to produce a signal containing traffic channel data further includes:

selecting and outputting a first group of symbols from a first inverse transformer output signals during a first period;

selecting and outputting a second group of symbols from a second inverse transformer output signals during a second period to produce a signal containing traffic channel data.

15. The method for receiving data according to claim 13 wherein the step of space-time decoding each received transformed signal to produce inverse transformer output signals further includes estimating two symbols using coherently combined channel gains to produce inverse transformer output signals.

16. A system for receiving data in a receiver in a wireless communication system, wherein the data has been transmitted from a transmitter using an antenna array to transmit a signal having transmit diversity, the system comprising:

a receiver for receiving and down-converting a received signal to produce a baseband received signal;

despreaders for despreading the baseband received signal using despreading codes that correspond to spreading codes used in the transmitter to produce antenna signals that are transmitted from antennas in the antenna array, wherein the despreading produces received transformed signals;

space-time decoders for space-time decoding each received transformed signal to produce inverse transformer output signals; and a de-commutator for de-commutating all inverse transformer output signals to produce a signal containing traffic channel data.

17. The system for receiving data according to claim 16 wherein the de-commutator for de-commutating all inverse transformer output signals to produce a signal containing traffic channel data further includes:

means for selecting and outputting a first group of symbols from a first inverse transformer output signals during a first period;

means for selecting and outputting a second group of symbols from a second inverse transformer output signals during a second period to produce a signal containing traffic channel data.

18. The system for receiving data according to claim 16 wherein the space-time decoders for space-time decoding each received transformed signal to produce inverse transformer output signals further include means for estimating two symbols using coherently combined channel gains to produce inverse transformer output signals.

19. A method for transmitting data from a transmitter to a receiver in a wireless communication system, wherein the transmitter uses an antenna array to transmit a signal having transmit diversity, the method comprising the steps of:

space-time coding groups of symbols of an input data stream to produce first and second transformed data streams;

spreading each transformed data stream with a same spreading code to produce a plurality of antenna signals;

selecting one of a plurality of space apart antennas from the antenna array for each one of the plurality of antenna signals, wherein the plurality of spaced apart antennas are spaced apart to provide transmit diversity; and transmitting each of the plurality of antenna signals from the selected one of the plurality of spaced apart antennas.

20. The method for transmitting data according to claim 19 wherein the step of space-time coding a group of symbols of an input data stream to produce first and second transformed data streams further includes:

in response to an input data stream having symbols $S_1 S_2$, outputting, during a first period, symbol $S_1$ from a first transform output, and outputting a negative complex conjugate of symbol $S_2$ from a second transform output; and outputting, during a second period, symbol $S_2$ from the first transform output, and outputting a complex conjugate of symbol $S_1$ from the second transform output, wherein the first and second transform outputs output first and second transformed data streams.

21. The method for transmitting data according to claim 19 wherein the step of spreading each transformed data stream with a spreading code to produce a plurality of antenna signals further includes spreading each transformed data stream with a same spreading code to produce a plurality of antenna signals.

22. The method for transmitting data according to claim 19 wherein the step of selecting one of a plurality of spaced apart antennas from the antenna array for each one of the plurality of antenna signals further includes periodically selecting N number of a plurality of X number of spaced apart antennas in the antenna array for each of N number of antenna signals, wherein N is an integer greater than or equal to 2, and X is an integer greater than or equal to 1.

23. The method for transmitting data according to claim 19 wherein the step of transmitting each of the plurality of antenna signals from the selected one of the plurality of spaced apart antennas further includes modulating, upconverting, amplifying, and transmitting each of the plurality of antenna signals from the selected one of the plurality of spaced apart antennas, wherein the plurality of spaced apart antennas are spaced apart to provide transmit diversity.

24. A system for transmitting data from a transmitter to a receiver in a wireless communication system, wherein the transmitter uses an antenna array to transmit a signal having transmit diversity, the system comprising:

a space-time coder for space-time coding groups of symbols of an input data stream to produce first and second transformed data streams;

spreaders for spreading each transformed data stream with a same spreading code to produce a plurality of antenna signals;

means for selecting one of a plurality of spaced apart antennas from the antenna array for each one of the plurality of antenna signals, wherein the plurality of spaced apart antennas are spaced apart to provide transmit diversity; and a transmitter for transmitting each of the plurality of antenna signals from the selected one of the plurality of spaced apart antennas.

25. The system for transmitting data according to claim 24 wherein the space-time coder for space-time coding a group of symbols of an input data stream to produce first and second transformed data streams further includes:

means for outputting, during a first period, symbol $S_1$ from a first transform output, and outputting a negative complex conjugate of symbol $S_2$ from a second transform output in response to an input data stream having symbols $S_1S_2$; and means for outputting, during a second period, symbol $S_2$ from the first transform output, and outputting a complex conjugate of symbol $S_1$ from the second transform output, wherein the first and second transform outputs output first and second transformed data streams.

26. The system for transmitting data according to claim 24 wherein the spreaders for spreading each transformed data stream with a spreading code to produce a plurality of antenna signals further includes spreaders for spreading each transformed data stream with a same spreading code to produce a plurality of antenna signals.

27. The system for transmitting data according to claim 24 wherein the means for selecting one of a plurality of spaced apart antennas from the antenna array for each one of the plurality of antenna signals further includes means for periodically selecting N number of a plurality of X number of spaced apart antennas in the antenna array for each of N number of antenna signals, wherein N is an integer greater than or equal to 2, and X is an integer greater than or equal to 1.

28. The system for transmitting data according to claim 24 wherein the transmitters for transmitting each of the plurality of antenna signals from the selected one of the plurality of spaced apart antennas further includes means for modulating, upconverting, amplifying, and transmitting each of the plurality of antenna signals from the selected one of the plurality of spaced apart antennas, wherein the plurality of spaced apart antennas are spaced apart to provide transmit diversity.

29. A method for receiving data in a receiver in a wireless communication system, wherein the data has been transmitted from a transmitter using selected antennas in an antenna array for selected time periods to transmit a signal having different channels in response to the selected antennas in the selected time periods, the method comprising the steps of:

receiving and down-converting a received signal to produce a baseband received signal;

despreading the baseband received signal using a despread code that corresponds to a spreading code used in the transmitter to produce a plurality of antenna signals that are transmitted from selected antennas in the antenna array, each antenna in the antenna array utilizing a same spreading code, wherein the despreading produces received transformed signals; and in response to the channel determined by the selected antennas in the selected time period, space-time decoding each received transformed signal to produce inverse transformed output signals.

30. A system for receiving data in a receiver ina wireless communication system, wherein the data has been transmitted from a transmitter using selected antennas in an antenna array for selected time periods to transmit a signal having different channels in response to the selected antennas in the selected time periods, the system comprising:

a receiver for receiving and down-converting a received signal to produce a baseband received signal;

a despreader for despreading the baseband received signal using a despreading code that corresponds to a spreading code used in the transmitter to produce a plurality of antenna signals that are transmitted from selected antennas utilizing a same spreading code for each antenna in the antenna array, wherein the despreading produces received transformed signals; and an inverse transformer for inverse transforming each received transformed signal to produce inverse transformer output signals in response to the channel determined by the selected antennas in the selected time period.

* * * * *